United States Patent
Ott et al.

(10) Patent No.: US 11,316,879 B2
(45) Date of Patent: Apr. 26, 2022

(54) SECURITY PROTECTION FOR A HOST COMPUTER IN A COMPUTER NETWORK USING CROSS-DOMAIN SECURITY-RELEVANT INFORMATION

(71) Applicant: VMware, Inc., Palo Alto, CA (US)

(72) Inventors: David Ott, Chandler, AZ (US); Lei Xu, College Station, TX (US); Ruimin Sun, Gainesville, FL (US); Vijay Ganti, Fremont, CA (US); Dennis R. Moreau, San Carlos, CA (US)

(73) Assignee: VMWARE, INC., Palo Alto, CA (US)

( * ) Notice: Subject to any disclaimer, the term of this patent is extended or adjusted under 35 U.S.C. 154(b) by 317 days.

(21) Appl. No.: 16/255,551

(22) Filed: Jan. 23, 2019

(65) Prior Publication Data
US 2020/0236122 A1 Jul. 23, 2020

(51) Int. Cl.
*G06F 9/455* (2018.01)
*H04L 29/06* (2006.01)

(52) U.S. Cl.
CPC ...... *H04L 63/1425* (2013.01); *G06F 9/45558* (2013.01); *H04L 63/1416* (2013.01); *H04L 63/20* (2013.01); *G06F 2009/45587* (2013.01); *G06F 2009/45595* (2013.01)

(58) Field of Classification Search
CPC . H04L 63/1425; H04L 63/1416; H04L 63/20; G06F 9/45558; G06F 2009/45587; G06F 2009/45595; G06F 9/455
See application file for complete search history.

(56) References Cited

U.S. PATENT DOCUMENTS

| 8,925,088 | B1* | 12/2014 | Wilhelm | G06F 21/552 726/24 |
| 10,782,990 | B1* | 9/2020 | Suarez | G06F 9/5005 |
| 2010/0319069 | A1* | 12/2010 | Granstedt | H04L 63/0263 726/22 |
| 2014/0082236 | A1* | 3/2014 | Zhang | G06F 8/63 710/74 |
| 2015/0295945 | A1* | 10/2015 | Canzanese, Jr. | H04L 63/145 726/23 |
| 2016/0285897 | A1* | 9/2016 | Gantman | H04L 63/145 |

OTHER PUBLICATIONS

Gu et al.; Building a Security OS With Software Defined Infrastructure; In Proceedings of APSys '17, Mumbai, India, Sep. 2, 2017, 8 pages.

* cited by examiner

*Primary Examiner* — Theodore C Parsons
*Assistant Examiner* — Howard H. Louie
(74) *Attorney, Agent, or Firm* — Loza & Loza, LLP (57) ABSTRACT

A computer-implemented method and system for protecting a host computer in a computer network from security threats uses local security-relevant data for the host computer, as well as global security-relevant data for other components in the computer network downloaded from a security information plane system to the host computer, to determine a security threat to the host computer. When a security threat is determined to be a legitimate threat, a security alert is issued, and then an action is initiated in response to the security alert.

14 Claims, 7 Drawing Sheets

SECURITY PROTECTION FOR A HOST COMPUTER IN A COMPUTER NETWORK USING CROSS-DOMAIN SECURITY-RELEVANT INFORMATION

BACKGROUND

Large enterprise clouds are exposed to numerous security-related problems, which may vary in problem type and/or data type. The default solution to these problems is to provide partial fixes throughout an enterprise cloud in an ad hoc and piecemeal manner. As an example, network monitors and firewalls may be inserted and configured at various locations within the enterprise cloud topology while security monitoring software may be installed in select servers to address a different set of security problems. However, the lack of coordination and correlation of security-relevant information across these mechanisms limits the overall effectiveness of security protection across the enterprise cloud, creating unexpected security problems for sophisticated attackers who understand the gaps between piecemeal solutions.

In addition, at each computing system running applications in an enterprise cloud, security-related problems are typically handled using security software running on that computing system. The security software uses security-relevant data that is available to the computing system to detect security compromises and malicious behaviors with respect to the computing system. As an example, to detect application compromises and malicious behavior, a whitelist model may be built that classifies system events (network communication events, system call events, IO events, etc.) as "in bounds/expected" and "out of bounds/unexpected". The model can be rule-based or machine learning (ML)-based and be trained on prior system events from a controlled execution environment. One concern with such a technique is that too many false positives may be generated, which may overwhelm an administrator. When the false positives become unmanageable, the security software may be disabled, which leaves the computing system vulnerable to actual security threats.

BRIEF DESCRIPTION OF THE DRAWINGS

Throughout the description, similar reference numbers may be used to identify similar elements.

DETAILED DESCRIPTION

Figure 1:
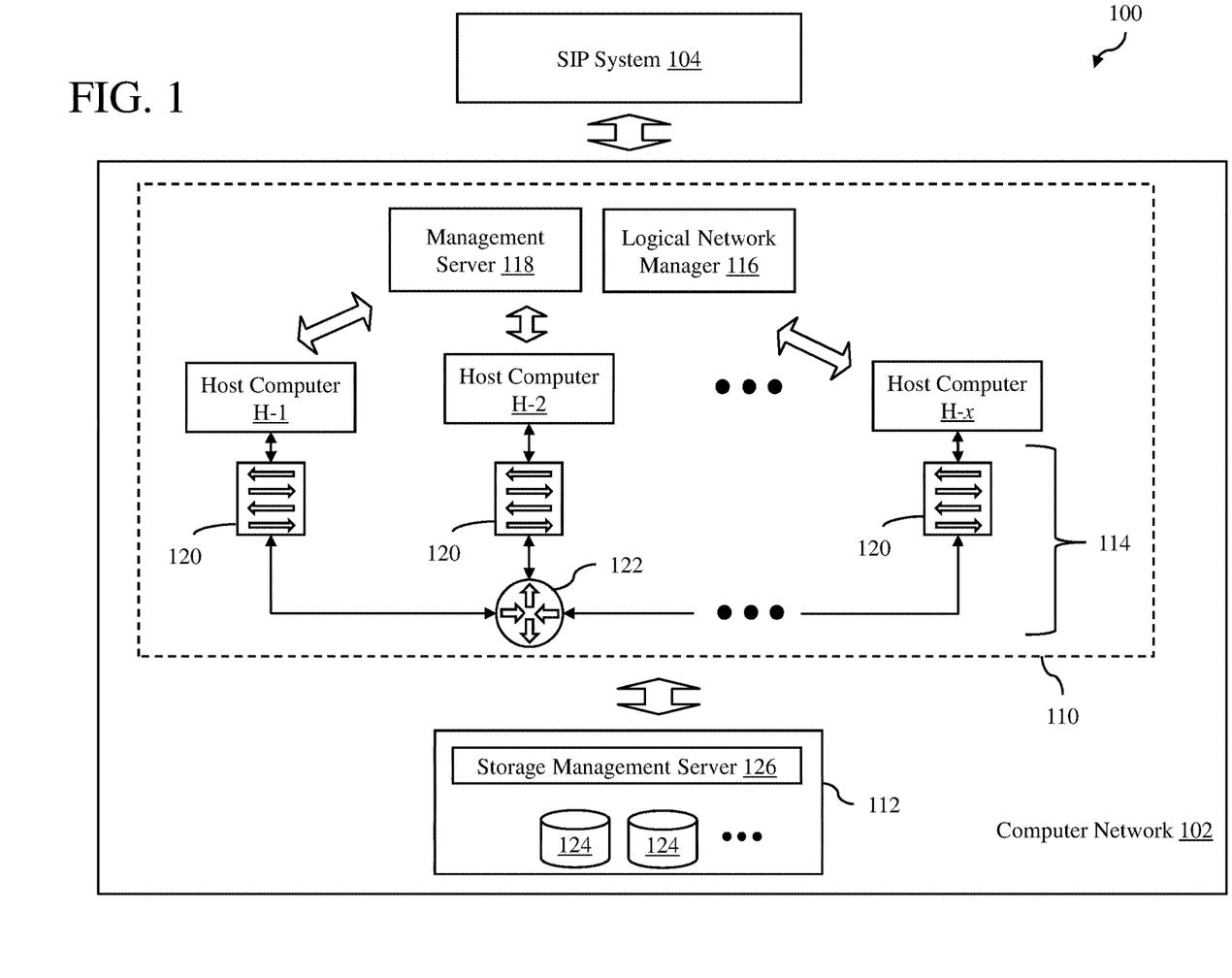
FIG. 1 is a block diagram of a system for exchanging security-relevant information in a computer network in accordance with an embodiment of the invention.

FIG. 1 shows a system 100 for exchanging security-relevant information in accordance with an embodiment of the invention. The system 100 includes a computer network 102 and a security information plane (SIP) system 104. As explained in more detail below, the system 100 allows security-relevant information from different sources throughout the computer network to be used by individual components of the computer network for better detection and analysis of security threats at those individual components, such as malicious attacks or unauthorized access. As an example, the security-relevant information from different sources throughout the computer network can be used to reduce false-positive detections of security threats/attacks that are based on local security-relevant data anomalies.

As depicted in FIG. 1, the computer network 102 includes one or more network clusters 110 and a storage system 112. Each network cluster includes a cluster of host computers H-1, H-2 . . . H-x (where x is a positive integer), a network infrastructure 114, a logical network manager 116 and a management server 118. The host computers are connected to each other and the storage system via the network infrastructure 114, and thus, communications between the host computers and the storage system are routed through the network infrastructure, which may comprise multiple subnets. The host computers are also connected to the logical network manager 116 and the management server 118. In an embodiment, the host computers are connected to the logical network manager 116 and the management server 118 via the network infrastructure 114. However, in other embodiments, the host computers may be connected to the logical network manager 116 and the management server 118 using other means, such as dedicated communication channels between the host computers and the logical network manager and the management server. The computer network 102 may be a data center, a cloud computing environment, such as an enterprise cloud infrastructure, or a segment of a larger computer network. In an embodiment, the computer network 102 may provide a software-defined infrastructure (SDI), where some or all of the host computers may operate as SDI nodes to support the SDI.

The host computers H-1, H-2 . . . H-x in each network cluster are physical computer systems that are used to support or host multiple virtual computing instances that can execute various applications. As used herein, the term "virtual computing instance" is any software entity that can run on a computer system, such as a software application, a software process, a virtual machine (VM) and a "container" that provides system-level process isolation, e.g., a Docker container. The host computers may be servers that are commonly found in data centers. As an example, the host computers may be servers installed in server racks.

Figure 2:
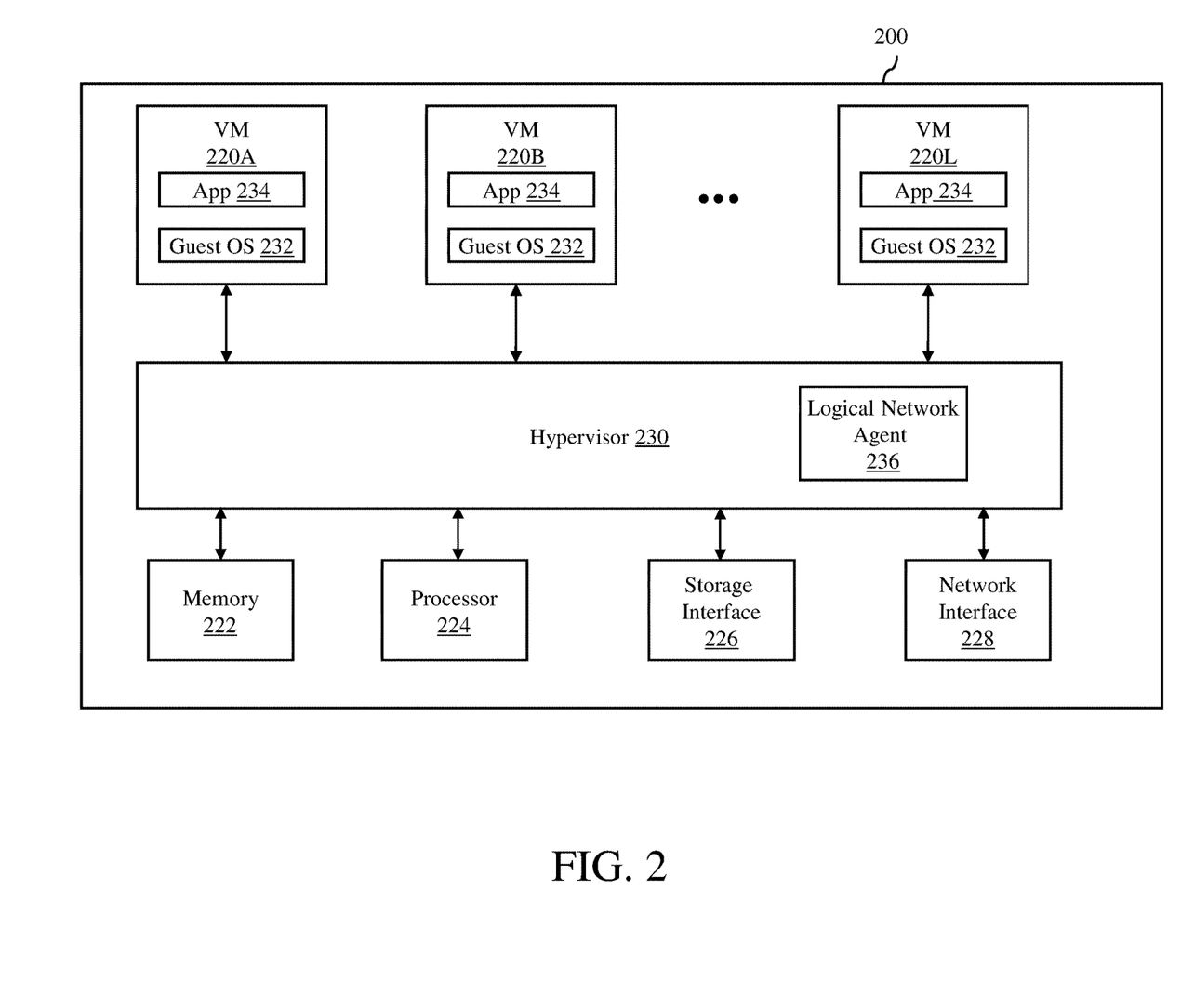
FIG. 2 is a block diagram of a representative host computer of host computers in the computer network in accordance with an embodiment of the invention.

Turning now to FIG. 2, components of a host computer 200 that is representative of the host computers H-1, H-2 . . . H-x in accordance with an embodiment of the invention are shown. In FIG. 2, the physical connections between the various components of the host computer 200 are not illustrated. In the illustrated embodiment, the host computer 200 is configured to support a number of virtual computing instances 220A, 220B . . . 220L (where L is a positive integer), which are VMs. The number of VMs supported by the host computer 200 can be anywhere from one to more than one hundred. The exact number of VMs supported by the host computer is only limited by the physical resources of the host computer 200. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows the host computer 200 to communicate with storage, which can be any kind of storage, such as locally attached disks or solid-state devices (SSDs), or the storage system 112. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor or other virtualization software may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 232 forms a software platform on top of which guest applications 234 run.

In the illustrated embodiment, the hypervisor 230 includes a logical network agent 236, which operates to provide logical networking capabilities, such as bridging, L3 routing, L2 switching and firewall capabilities, so that software defined networks or logical networks can be created. The logical network agent 236 may be part of a VMware NSX® logical network product installed in the host computer 200 ("VMware NSX" is a trademark of VMware, Inc.). In a particular implementation, the logical network agent 236 may be a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as STT, NVGRE, or Geneve, instead of, or in addition to, VXLAN.

Turning back to FIG. 1, the network infrastructure 114 of each network cluster allows communications between devices connected to the network infrastructure. The network infrastructure 114 may be configured to support any type of network, such as a wide area network (WAN), a local area network (LAN), a storage area network (SAN), and a Fibre Channel network. As illustrated in FIG. 1, the network infrastructure 114 may include any type of network device, such as switches 120, routers 122 and other physical networking components (not shown).

The logical network manager 116 of each network cluster operates to manage and control logical networks in the network cluster. Logical networks, also referred to as logical overlay networks, comprise logical network devices and connections that are then mapped to physical networking resources, e.g., the switches 120 and the routers 122, in a manner analogous to the manner in which other physical resources such as compute and storage are virtualized. In an embodiment, the logical network manager 116 has access to information regarding physical components in the network cluster, such as the host computers H-1, H-2 . . . H-x, the switches 120 and the routers 122, and logical network components in the network cluster, such as logical switches, logical routers and security devices. With the physical and logical network information, the logical network manager 116 is able to map logical network configurations to the physical network components that convey, route, and filter physical traffic in the cluster. In one particular implementation, the logical network manager 116 is a VMware NSX™ manager running on a physical computer in the cluster, similar to the host computer 200 shown in FIG. 2.

The management server 118 of each network cluster operates to monitor and manage the host computers H-1, H-2 . . . H-x in the cluster. The management server 118 may be configured to monitor the current configurations of the host computers and the virtual computing instances running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include virtual computing instance hosting information, i.e., which virtual computing instances, e.g., VMs, are hosted or running on which host computers. The monitored configurations may also include virtual computing instance information. The virtual computing instance information may include size of each of the virtual computing instances, i.e., virtualized hardware configuration of each of the virtual computing instances, such as virtual CPU type, number of virtual CPUs, virtual memory size, and virtual storage size, as well as software configuration of each of the virtual computing instances, such as OS type and installed applications or software programs running on each of the virtual computing instances. The virtual computing instance information may also include resource parameter settings, such as demand, limit, reservation and share values for various resources, e.g., CPU, memory, network bandwidth and storage, which are consumed by the virtual computing instances. The demands of the virtual computing instances for the consumable resources may be determined by the host computers or the hypervisors hosting the virtual computing instances by monitoring the current usage of resources by the virtual computing instances, e.g., CPU processing usage, memory usage, network usage and/or storage usage, and provided to the management server 118.

The management server 118 may also perform operations to manage the virtual computing instances and the host computers H-1, H-2 . . . H-x in the cluster. The management server may be configured to perform various resource management operations for the cluster, including virtual computing instance placement operations for either initial placement of virtual computing instances and/or load balancing. The process for initial placement of virtual computing instances, such as VMs, may involve selecting suitable host computers for placement of the virtual computing instances based on memory and CPU requirements of the virtual computing instances, the current memory and CPU load on all the host computers in the cluster and the memory and CPU capacity of all the host computers in the cluster.

In some embodiments, the management server 118 may be a physical computer. In other embodiments, the management server may be implemented as one or more software programs running on one or more physical computers, such as the host computer 200 shown in FIG. 2, or virtual computers, such as the VMs 220A, 220B . . . 220L. In an implementation, the management server is a VMware vCenter™ server with at least some of the features available for such a server.

The storage system 112 of the computer network 102 includes one or more computer data storage devices 124, which are used to store data. The data storage devices can be any type of non-volatile storage devices that are commonly used for data storage. As an example, the data storage devices may be, but not limited to, solid-state devices (SSDs), hard disks or a combination of the two.

In an embodiment, the storage system 112 may include local storage of the host computers in the computer network 102, such as hard drive disks in physical server-grade computers. In another embodiment, the storage system may be a distributed storage system such as a storage area network (SAN). In still another embodiment, the storage system may be a collection of local storage systems of physical computers that form a virtual SAN. In still another embodiment, the storage system may be a remote storage system that can be accessed via a network, such as a network-attached storage (NAS). Depending on the storage type, the storage system may include other components commonly found in that storage type, such as network adapters and storage drivers. In an embodiment, the storage system may include a storage management server 126, which oversees and manages the data storage devices 124. Thus, the storage management server may receive or generate security-relevant data with respect to the storage system. The storage system may be scalable, and thus, the number of data storage devices included in the storage system can be changed as needed to increase or decrease the capacity of the storage system to support increase/decrease in workload. Consequently, the exact number of data storage devices included in the storage system can vary from one to hundreds or more.

The SIP system 104 of the system 100 functions as a repository of security information for the computer network 102. The security information may include raw heterogenous security-relevant data from the computer network and may also include information derived from some or all of the raw heterogenous security-relevant data. In some embodiments, the SIP system may collect heterogenous security-relevant data directly from various components of the computer network, such as the host computers H-1, H-2 . . . H-x, the logical network manager 116 and the management server 118. The security information aggregation system may also aggregate some or all of the collected security-relevant data using one or more aggregation operations to generate networkwide aggregated security information. As used herein, the term "networkwide aggregated security information" refers to information regarding security throughout a network that is generated by aggregating heterogenous security-relevant data from various sources within the network. The aggregation operations that may be performed on the received heterogenous security-relevant data may vary. As an example, the aggregation operations may involve data composition, differential analysis and correlation. As another example, the aggregation operations may be operations that generate graphs or machine learning models related to security in the computer network 102. Since the networkwide aggregated security information is derived from heterogenous security-relevant data from various components that are situated throughout the computer network, the networkwide aggregated security information can provide a broader security information than security-relevant information from one individual component of the computer network, as explained in more detail below.

Figure 3:
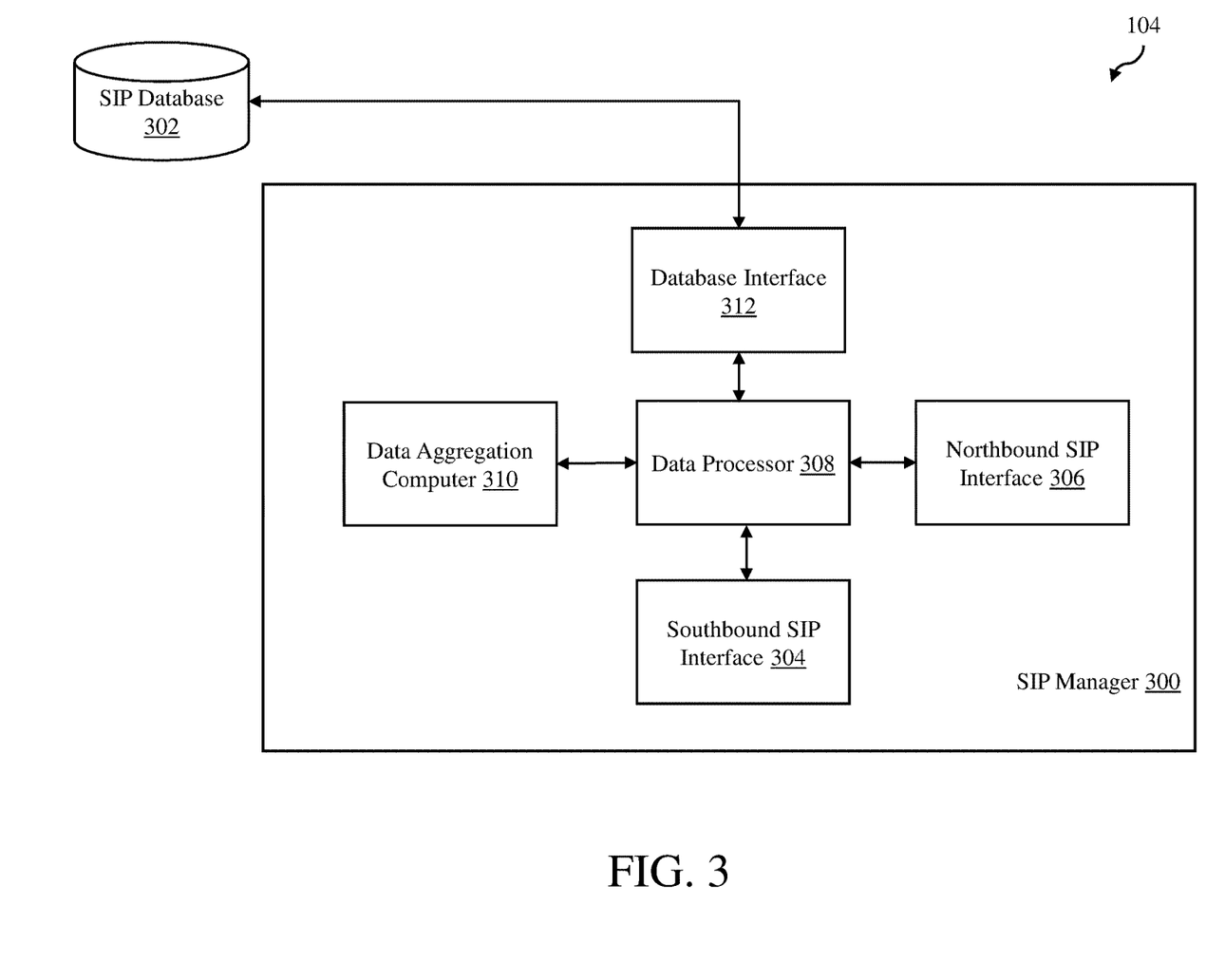
FIG. 3 is a block diagram of a security information plane (SIP) system in the system shown in FIG. 1 in accordance with an embodiment of the invention.

In an embodiment, as illustrated in FIG. 3, the SIP system 104 includes a SIP manager 300 and an SIP database 302, which function as an information substrate to enable the exchange and aggregation of security-relevant data from various components of the computer network 102. Thus, the SIP manager operates to interface with various components of the computer network, such as the host computers H-1, H-2 . . . H-x, the logical network manager 116 and the management server 118, to collect different types of security-relevant data and aggregate the collected information, which can be used to provide a holistic security overview of the entire computer network that can then be applied to provide more effective security services for different components of the computer network.

As shown in FIG. 3, the SIP manager 300 includes a southbound SIP interface 304, a northbound SIP interface 306, a data processor 308, a data aggregation computer 310, and a database interface 312. These components of the SIP manager can be implemented as software, hardware or a combination of software and hardware. In a particular implementation, the SIP manger may be installed in a physical computer, such as the host computer 200, or in a virtual computing instance, such as a VM, running inside or outside of the computer network 102.

The southbound SIP interface 304 of the SIP manager 300 allows various components in the computer network 102 to communicate with the SIP manager to upload and/or download security-relevant information. As used herein, the southbound SIP interface refers to an interface to lower layers of security management, which includes components in the computer network, such as the host computers H-1, H-2 . . . H-x, some of which may be functioning as SDI nodes. In particular, the SIP manager can receive heterogeneous security-relevant data from various sources in the computer network via the southbound SIP interface. The security-relevant data includes not only raw security data from some of the different sources, but also security alerts and security flags that have been generated from some of the different sources in response to raw security data. The security-relevant data may also include security-relevant rules and policies that have been implemented in some of the different sources. As an example, the SIP manager may receive configuration data, security policy data, log files, system events, network events, storage events and application alerts from various components in the computer network. Some of the security-relevant data that is received by the SIP manager via the southbound SIP interface may already be accumulated or otherwise processed and/or formatted to a particular data structure. However, some of the security-relevant data that is received by the SIP manager via the southbound SIP interface may be raw security-relevant data, i.e., data that is not processed and/or formatted to a particular data structure prior to being received by the SIP manager.

The data processor 308 of the SIP manager 300 operates to selectively process the security-relevant data received by the SIP manager via the southbound SIP interface 304 before being sent to the data aggregation computer 310 to generate networkwide aggregated security data. The data processor may format unformatted security-relevant data received by the SIP manager so that the security-relevant data can be properly used by the data aggregation computer. The data processor also manages the networkwide aggregated security data generated by the data aggregation computer to be stored in the SIP database 302, which may reside in any storage accessible by the SIP manager. Thus, the data processor can control the storing and retrieving of networkwide aggregated security data, as well as the received security-relevant data, using the SIP database via the database interface 312. The data processor may use any storage technology to store data in the SIP database using the database interface, which may use any database interface protocol to store data in and retrieve data from the SIP database.

The data aggregation computer 310 of the SIP manager 300 operates to aggregate the received heterogenous security-relevant data from different sources in the computer network 102 to output networkwide aggregated security information. The data aggregation computer 310 may apply one or more aggregation operations to the received heterogenous security-relevant data to generate the networkwide aggregated security information. The networkwide aggregated security information generated by the data aggregation computer can vary depending on how the networkwide aggregated security information is to be used by other components in the system 100. The aggregation operations that may be performed on the received heterogenous security-relevant data may vary. As an example, the aggregation operations may involve data composition, differential analysis and correlation. As another example, the aggregation operations may be operations that generate graphs or machine learning models related to security in the computer network 102. The data aggregation computer may maintain a library of common aggregation functions to perform one or more aggregation operations on the received heterogenous security-relevant data. Some of these aggregation operations or algorithms may be uploaded to the SIP manager to be used by the data aggregation computer from any management computer or any appropriate component, such as any host computer, in the computer network 104. In some embodiments, the aggregation algorithms may be stored in the SIP database 302 or any database accessible by the data aggregation computer. Since the networkwide aggregated security information generated by the data aggregation computer is derived from heterogenous security-relevant data from various components that are situated throughout the computer network, the networkwide aggregated security information can provide a more robust and insightful security information of the entire computer network than security information derived from homogenous security-relevant data.

The northbound SIP interface 306 of the SIP manager 300 allows a management computer (not shown) to communicate with the SIP manager to upload and/or download security-relevant information. Thus, the SIP manager can provide the networkwide aggregated security information, as well as security-relevant data received from various sources of the computer network 102, to the management computer.

In order to interface with the SIP system 104, some of the host computers H-1, H-2 . . . H-x of the computer network 102 may include a SIP virtual computing instance, e.g., a customized virtual machine, to upload and download security-relevant data to and from the SIP system. As an example, the SIP virtual computing instance may be included in a host computer of the computer network, which is operating as an SDI node, as illustrated in FIG. 4.

Figure 4:
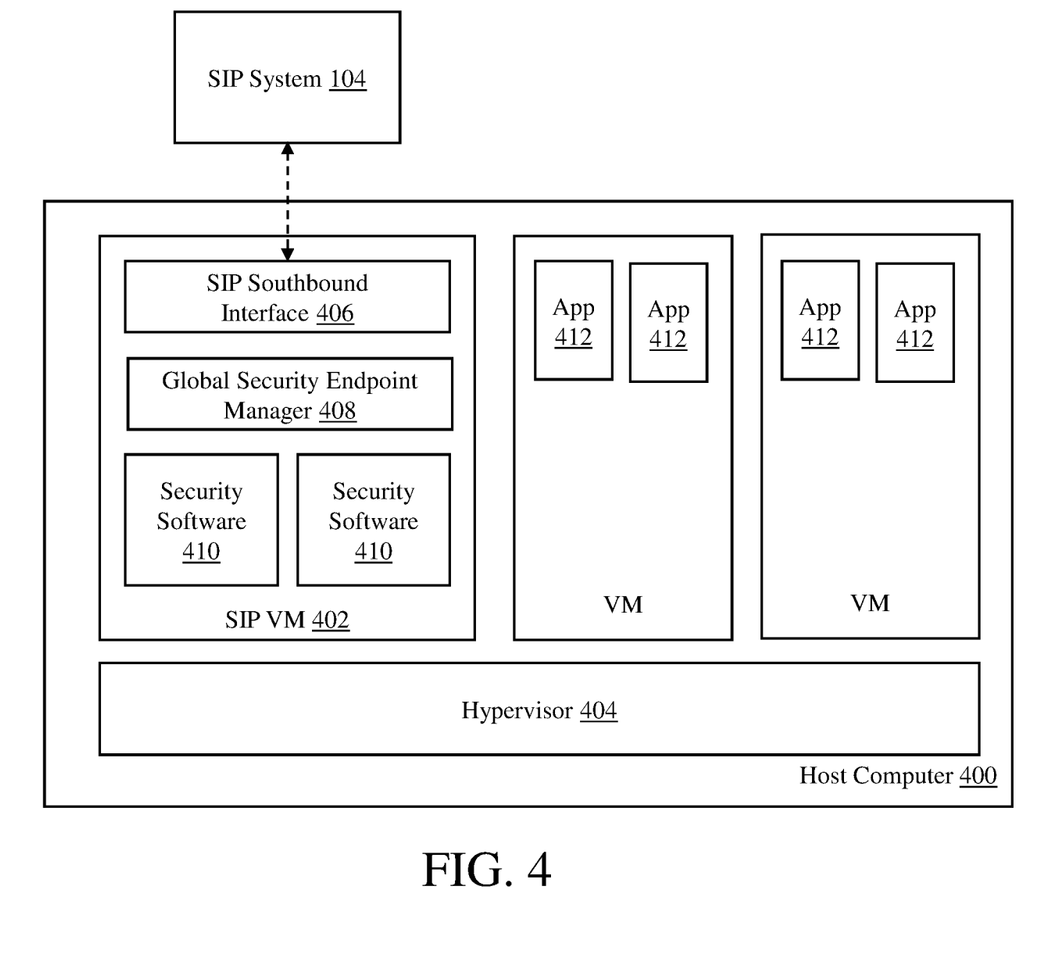
FIG. 4 is a block diagram of a host computer functioning as a software-defined infrastructure (SDI) node in accordance with an embodiment of the invention.

As shown in FIG. 4, a host computer 400 with a SIP virtual computing instance 402 in the form of a virtual machine in accordance with an embodiment of the invention is shown. The host computer is shown in FIG. 4 with only a hypervisor 404 and virtual machines, including the SIP virtual machine. Thus, in FIG. 4, other components of the host computer, such as memory, processor, storage interface and network interface, are not shown.

The SIP virtual machine 402 included in the host computer 400 includes a SIP southbound interface 406, a global security endpoint manager 408 and one or more security application/software 410. The virtualization for the SIP virtual machine provides isolation from the other virtual machines and processes internal and external to the host computer 400 to provide a secure environment for the SIP southbound interface, the global security endpoint manager and the security software in the SIP virtual machine.

The SIP southbound interface 406 of the SIP virtual machine 402 allows the SIP virtual machine to communicate with the SIP system 104 to upload and/or download security-relevant information. The SIP southbound interface may be an application programming interface that communicates with the SIP system, for example, the southbound SIP interface 304 of the SIP manager 300.

The global security endpoint manager 408 running in the SIP virtual machine 402 operates to interface with the SIP system 104 to upload local security-relevant data to the SIP system and download global security-relevant data from the SIP system. As used herein, local security-relevant data for a host computer is security-relevant data that is collected from that host computer, while global security-relevant data is security-relevant data that is collected from different components in a computer network (i.e., cross-domain security-relevant information). Global security-relevant data may include raw security-relevant data from different sources in a computer network, as well as networkwide aggregated security information. In an embodiment, the global security endpoint manager operates with the security software 410 running in the SIP virtual machine so that local security-relevant data from the security software can be passed to the global security endpoint manager and uploaded to the SIP system and the global security-relevant data downloaded from the SIP system to the global security endpoint manager can be passed to the security software and used by the security software.

In an embodiment, the global security endpoint manager 408 may define (1) types of security-relevant data that are uploaded to the SIP manager 300, (2) handling functions designed to manage the upload of different data types, and (3) data exchange modes. The types of security-relevant data may include any system events from the host computer 400, configuration information, security policy information, and application state information. The upload handling functions may involve the encapsulation of information to be uploaded for different data types, including format conversions, and then any data transmission techniques needed to securely upload data from the SIP virtual machine 402 to the SIP system 104. Data exchange modes may involve single exchanges, ongoing streaming exchanges, event-driven exchanges, publication/subscription exchanges, and other exchange formats.

The security software 410 running in the SIP virtual machine 402 can be any type of security software that provides security services, such as access control, antivirus and antimalware service, application security, behavioral analytics, data loss prevention, email security, firewalls and intrusion prevention. In some embodiments, the security software may include software that provides security protection for applications 412 running in different virtual machines in the host computer 400. The security software may provide some or all of the local security-relevant data to the global security endpoint manager 408 to be uploaded to the SIP system 104 from the host computer 400. The security software uses not only the local security-relevant data, but also uses the global security-relevant data downloaded from the SIP system to more effectively execute their security services, which may involve issuing warnings, isolating or shutting down infected or vulnerable applications running on the host computer.

As an example, to detect application compromises and malicious behavior, the security software 410 may use a whitelist model, which may be built to classify system events as expected events, i.e., no security threat, or as unexpected events, i.e., possible security threat. The whitelist model may be created using rule-based or machine learning (ML)-based techniques on prior system events from a controlled execution environment. However, rather than using only local security-relevant data from the host computer 400, e.g., local system events of the host computer, the security software also uses global security-relevant data from the SIP system 104, e.g., security-relevant data from other host computers in the computer network 102, to create a more robust whitelist model. Thus, in this example, the whitelist model is created using both the local security-relevant data from the host computer and the global security-relevant data from other host computers in the computer network so that security threats to the host computer are more sensitive to real security threats, such as waterhole attacks, and better able to detect false positives.

Figure 5:
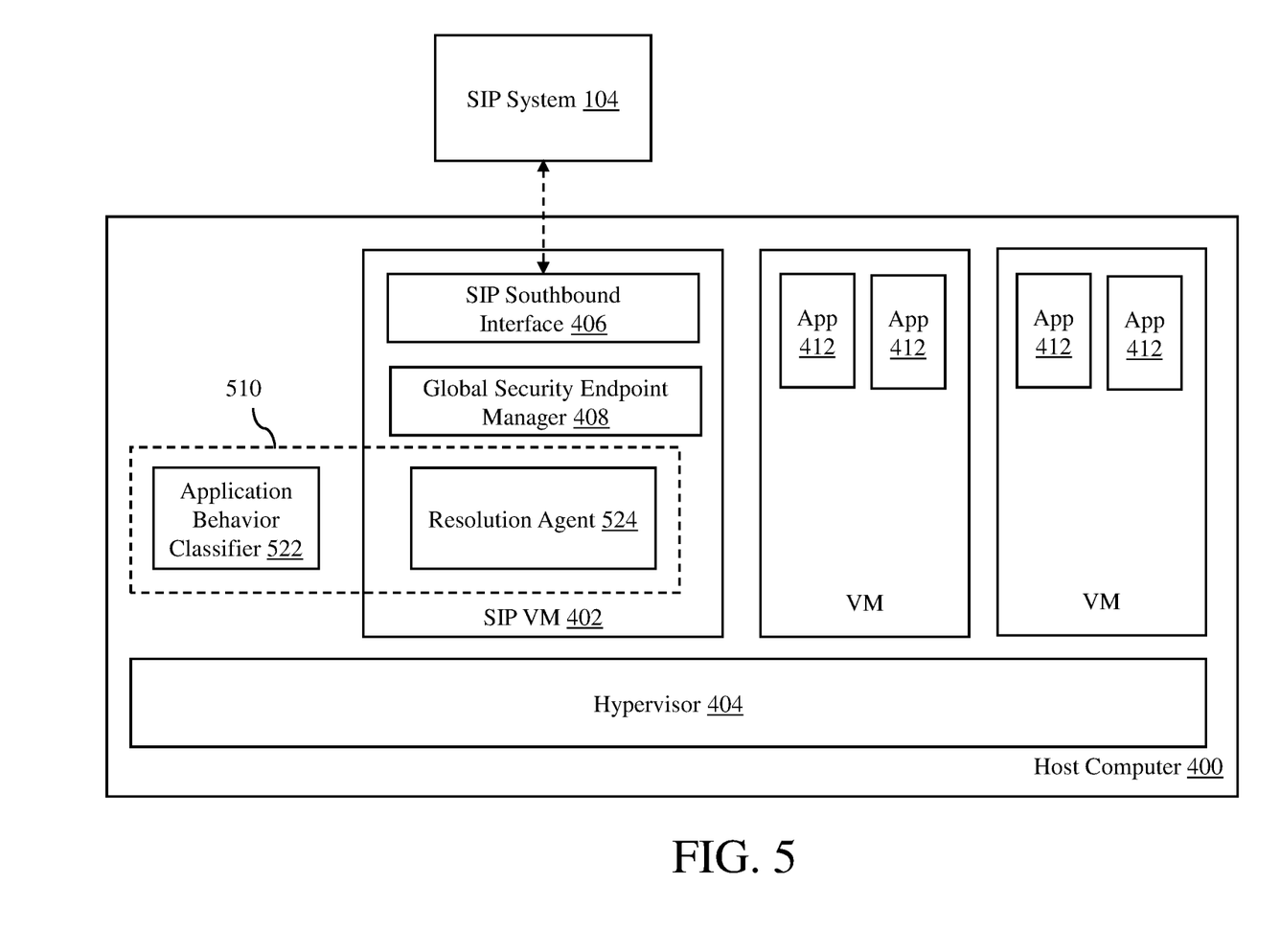
FIG. 5 is a block diagram of the host computer shown in FIG. 4 that includes an application security software in accordance with one implementation of an embodiment of the invention.

Turning now to FIG. 5, the host computer 400 that includes an application security software 510 in accordance with one implementation of an embodiment of the invention is shown. As explained below, the application security software operates to understand intended states and behaviors of the applications 412 running in the host computer, to monitor for changes to those intended states that indicate security threats, and to automatically respond to the detected threats, which may involve generating security alerts to let an administrator know of the detected security threats.

As shown in FIG. 5, the application security software 510 includes an application behavior classifier 522 and a resolution agent 524. The application behavior classifier operates to monitor system events of the applications 410 running in the host computer 400, e.g., running in the various virtual machines of the host computer, and network traffic within the host computer, as well as network traffic into and out of the host computer, associated with processes, executables, and operating systems to determine behaviors of the applications. The application behavior classifier then classifies the application system events and application behaviors into two categories. The first category is used to classify the application system events and application behaviors as "in" bounds or within bounds of expected application system events and behaviors under normal conditions, which indicates no security threats. The second category is used to classify the application system events and application behaviors as "out" of bounds or beyond bounds of expected application system events and behaviors under normal conditions, which indicates abnormal conditions or security threats. When this classification is made, the application behavior classifier issues an initial security alert to indicate that there may be a security threat. Thus, the application behavior classifier uses the local security-relevant data from the host computer and does not use any global security-relevant data from the SIP system 100 to determine that there may be a security threat. In an embodiment, the application behavior classifier may use the application system events and application behaviors that are monitored in real-time for an application to determine the current state and behavior of that application, which is then compared to the intended state and behavior of the application. The intended state and behavior of the application can be determined by analyzing the same application under known normal conditions. When the current state of the application deviates significantly from the intended state and behavior of the application, the current state and behavior of the application can be classified as the second category or the "out of bound" category. This significant deviation from the intended application state and behavior can be determined empirically or using other means, such as machine learning.

In the illustrated embodiment, the application behavior classifier 522 is shown as being outside of the hypervisor 404. However, in other embodiments, the application behavior classifier may operate within the hypervisor to monitor the application system events and application behaviors related to the applications 412 running in the virtual computers supported by the hypervisor.

The resolution agent 524 of the application security software 510 runs in the SIP virtual machine 402, which provides a secure operating environment for the resolution agent to protect the resolution agent against attacks from outside of the host computer or from the inside of the host computer, such as from other virtual machines running in the host computer. The resolution agent operates to receive the initial security alerts from the application behavior classifier 522 along with the application system events and data related to the current application states and behaviors that were used to issue the initial security alerts. In an embodiment, the initial security alerts and supporting information may be transmitted from the application behavior classifier to the resolution agent through the hypervisor 404. The resolution agent then performs a false-positive analysis on the received information using global security-related information from other components of the computer network 102, which is received from the SIP system 104 and provided to the resolution agent by the global security endpoint manager 408 running in the SIP virtual machine. In particular, the resolution agent uses the global security-related information from other components of the computer network, such as other application related information from other host computers in the computer network, to determine whether an initial security alert received from the application behavior classifier can be resolved as a "false-positive" alert or determined to be a legitimate security alert. As an example, the resolution agent may examine the global security-related information from other components of the computer network to determine whether the current alert is a waterhole attack. Such an attack would be difficult to detect using local security-related information only from a single host computer, but easier to detect using security-related information from sources throughout the computer network. As another example, the resolution agent may examine the security-related information from other host computers of the computer network to determine whether the supporting security-related information of an initial security alert from the application behavior classifier is similar to situations in other host computers where similar security-related information had been determined to be a "false-positive" alert or a legitimate security alert. When an initial security alert is determined to be a legitimate security alert, the resolution agent initiates an appropriate action, which may be presenting the alert or quarantining or shutting down the application at risk to isolate or remove the security threat.

Figure 6:
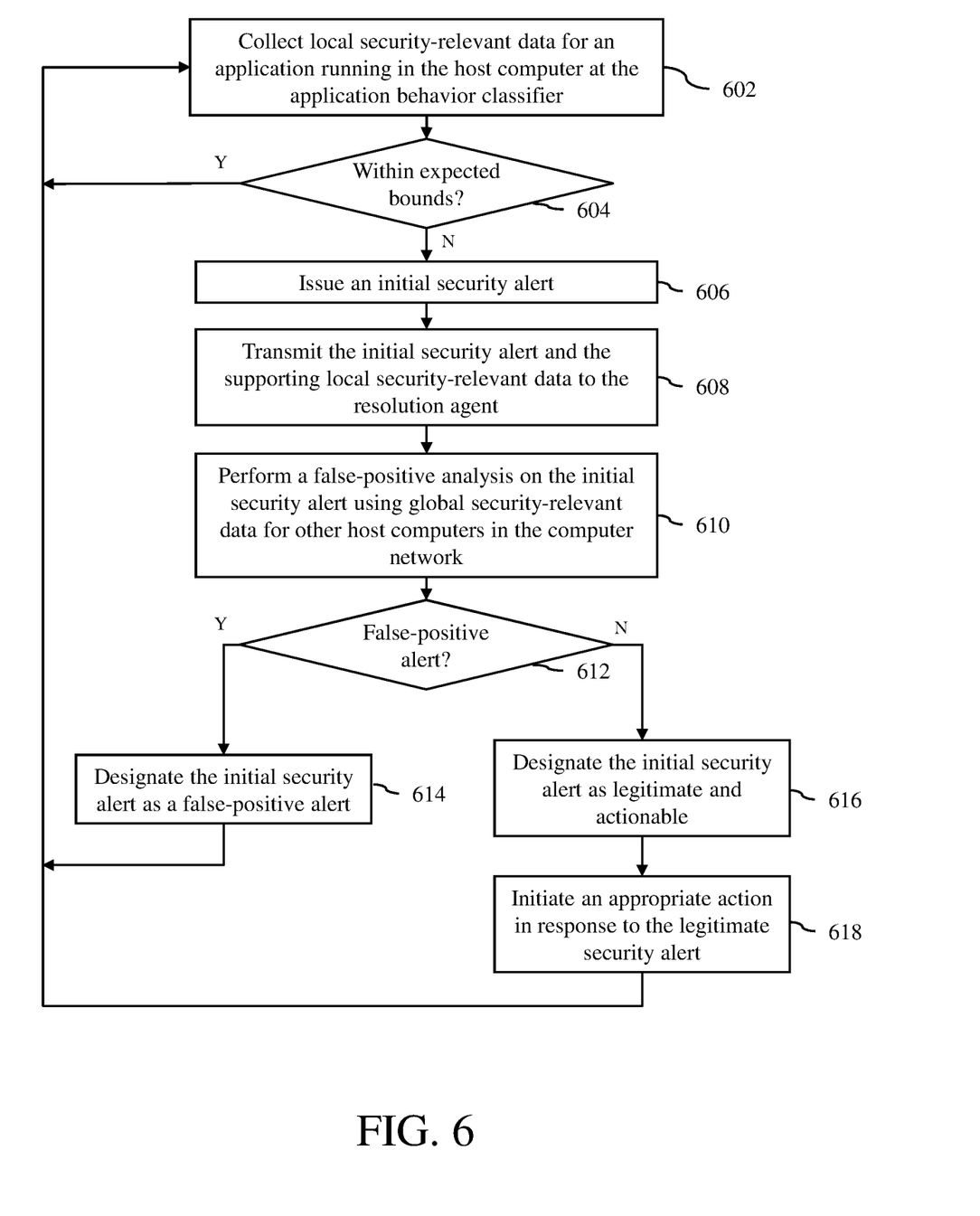
FIG. 6 is a process flow diagram of the application security operation performed by the host computer shown in FIG. 5 in accordance with an embodiment of the invention.

The application security operation performed by the host computer 400 shown in FIG. 5 in accordance with an embodiment of the invention is described with reference to a process flow diagram of FIG. 6. The operation begins at block 602, where local security-relevant data for an application 410 running in the host computer 400 is collected by the application behavior classifier 522 of the application security program 510 as part of an application monitoring process. The local security-relevant data may include system events and network traffic associated with the application in the host computer.

Next, at block 604, a determination is made by the application behavior classifier whether the collected security-relevant data is within the bounds of normal expected operation, i.e., no security threat. If the collected security-relevant data is determined to be within the bounds of normal expected operation, then the operation proceeds back to block 602 to collect additional security-relevant data for the application. However, if the collected security-relevant data is determined to be outside of the bounds of normal expected operation, then the operation proceeds block 606, where an initial security alert is issued by the application behavior classifier 522.

Next, at block 608, the initial security alert and the supporting security-relevant data are transmitted from the application behavior classifier 522 to the resolution agent 524 of the application security software 510 running in the SIP virtual machine 402 of the host computer 400. In an embodiment, the initial security alert and the supporting local security-relevant data are transmitted by the application behavior classifier to the resolution agent through the hypervisor 404 of the host computer 400.

Next, at block 610, a false-positive analysis is performed by the resolution agent on the initial security alert using global security-relevant data for other components in the computer network 102, such as security-relevant data from other host computers operating as SDI nodes in the computer network. In an embodiment, the false-positive analysis may be performed using raw security-relevant data from other components in the computer network as well as aggregated security information, which may be derived from the raw security-relevant data. The false positive analysis may include evaluating observed network connections, changes in the virtual machine's process table, interactions with storage servers, device I/O access, data copy and transmission operations across various channels, changes to application state, inter-process communication events, actions pertaining to cryptographic keys, and so on.

Next, at block 612, a determination is made by the resolution agent 524 whether the alert is a false-positive alert using the results of the false-positive analysis. If the alert is determined to be a false-positive alert, then the alert is designated as not a legitimate alert by the resolution agent, at block 614. Thus, no action may be taken by the application security software 510 in response to the alert. The operation then proceeds back to block 602 to continue to monitor the application.

However, if the alert is determined not to be a false-positive alert, then the alert is designated as legitimate and actionable by the resolution agent 524, at block 616. Next, at block 618, an appropriate action is initiated by the resolution agent in response to the legitimate security alert. As an example, the appropriate action may include presenting the alert to an administrator on a user interface displayed on a computer monitor (not shown) associated with the host computer. As another example, the appropriate action may include quarantining or shutting down the application to isolate or remove any security threat. The operation may then proceed back to block 602 to continue to monitor the application, if the application is still operating. Otherwise, the operation comes to an end.

Figure 7:
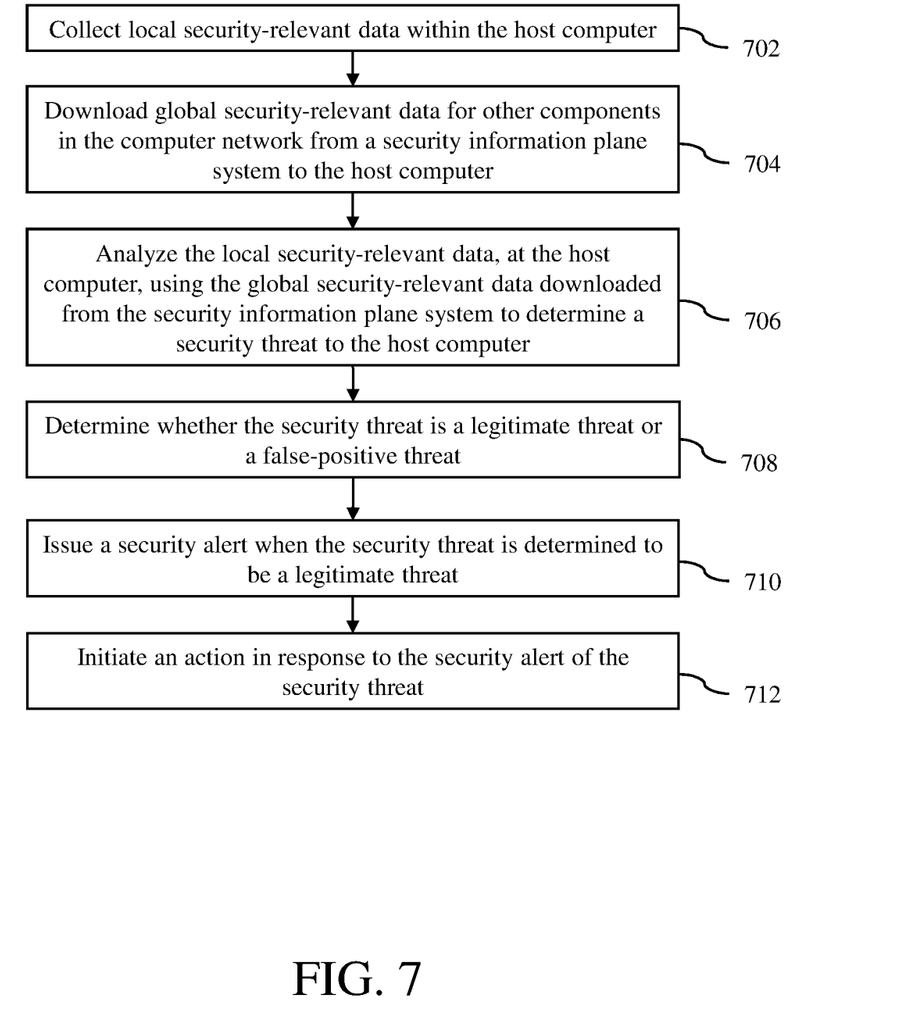
FIG. 7 is a flow diagram of a method for protecting a host computer in a computer network from security threats in accordance with an embodiment of the invention.

A computer-implemented method for protecting a host computer in a computer network from security threats in accordance with an embodiment of the invention is described with reference to a flow diagram of FIG. 7. At block 702, local security-relevant data of the host computer is collected. At block 704, global security-relevant data for other components in the computer network is downloaded from a security information plane system to the host computer. At block 706, the local security-relevant data is analyzed at the host computer using the global security-relevant data downloaded from the security information plane system to determine a security threat to the host computer. At block 708, the security threat is determined to be a legitimate threat or a false-positive threat. At block 710, the security alert is issued when the security threat is determined to be a legitimate threat. At block 712, an action is initiated in response to the security alert of the security threat.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for protecting a host computer in a computer network from security threats, the method comprising:
    collecting local security-relevant data of the host computer, wherein the local security-relevant data includes system events of applications running in the host computer and network traffic associated with the host computer;
    downloading global security-relevant data for other components in the computer network from a security information plane system to the host computer, wherein the global security-relevant data includes application related information from other host computers in the computer network;
    analyzing the local security-relevant data, by an application behavior classifier running in the host computer, without using the global security-relevant data to categorize the local security-relevant data as being one of within bounds of expected application behavior and out of the bounds of expected application behavior and determine a security threat to the host computer when the local security-relevant data is categorized as being out of the bounds of expected application behavior;
    in response to a determination that the local security-relevant data is categorized as being out of the bounds of expected application behavior, determining whether the security threat is a legitimate threat or a false-positive threat, by a resolution agent running in the host computer, using the global security-relevant data downloaded from the security information plane system;
    issuing a security alert when the security threat is determined to be a legitimate threat; and
    initiating an action in response to the security alert of the security threat, wherein the action includes quarantining or shutting down an application at risk.

2. The method of claim 1, further comprising uploading at least some of the local security-related data to the security information plane system from a security information plane application running in a virtual computing instance in the host computer, and wherein downloading the global security-relevant data includes downloading the global security-relevant data to the security information plane application running in the virtual computing instance in the host computer.

3. The method of claim 2, wherein the virtual computing instance is a virtual machine running in the host computer.

4. The method of claim 1, wherein analyzing the local security-relevant data includes using a whitelist model to categorize the local security-relevant data as being one of within bounds of expected application behavior and out of the bounds of expected application behavior.

5. The method of claim 2, wherein the resolution agent is running in the virtual computing instance in the host computer and the application behavior classifier is running outside of the virtual computing instance in the host computer.

6. A non-transitory computer-readable storage medium containing program instructions for a method for protecting a host computer in a computer network from security threats, wherein execution of the program instructions by one or more processors of a computer system causes the one or more processors to perform steps comprising:
    collecting local security-relevant data of the host computer, wherein the local security-relevant data includes system events of applications running in the host computer and network traffic associated with the host computer;
    downloading global security-relevant data for other components in the computer network from a security information plane system to the host computer, wherein the global security-relevant data includes application related information from other host computers in the computer network;
    analyzing the local security-relevant data, by an application behavior classifier running in the host computer, without using the global security-relevant data to categorize the local security-relevant data as being one of within bounds of expected application behavior and out of the bounds of expected application behavior and determine a security threat to the host computer when the local security-relevant data is categorized as being out of the bounds of expected application behavior;

in response to a determination that the local security-relevant data is categorized as being out of the bounds of expected application behavior, determining whether the security threat is a legitimate threat or a false-positive threat, by a resolution agent running in the host computer, using the global security-relevant data downloaded from the security information plane system;

issuing a security alert when the security threat is determined to be a legitimate threat; and initiating an action in response to the security alert of the security threat, wherein the action includes quarantining or shutting down an application at risk.

7. The computer-readable storage medium of claim 6, wherein the steps further comprise uploading at least some of the local security-related data to the security information plane system from a security information plane application running in a virtual computing instance in the host computer, and wherein downloading the global security-relevant data includes downloading the global security-relevant data to the security information plane application running in the virtual computing instance in the host computer.

8. The computer-readable storage medium of claim 7, wherein the virtual computing instance is a virtual machine running in the host computer.

9. The computer-readable storage medium of claim 6, wherein analyzing the local security-relevant data includes using a whitelist model to categorize the local security-relevant data as being one of within bounds of expected application behavior and out of the bounds of expected application behavior.

10. The computer-readable storage medium of claim 7, wherein the resolution agent is running in the virtual computing instance in the host computer and the application behavior classifier is running outside of the virtual computing instance in the host computer.

11. A system comprising:
a computer network;
a security information plane system coupled to the computer network; and
a host computer including at least one processor configured to:
collect local security-relevant data of the host computer, wherein the local security-relevant data includes system events of applications running in the host computer and network traffic associated with the host computer;
download global security-relevant data for other components in the computer network from the security information plane system to the host computer, wherein the global security-relevant data includes application related information from other host computers in the computer network;
analyze the local security-relevant data, using an application behavior classifier running in the host computer, without using the global security-relevant data to categorize the local security-relevant data as being one of within bounds of expected application behavior and out of the bounds of expected application behavior and determine a security threat to the host computer when the local security-relevant data is categorized as being out of the bounds of expected application behavior;
in response to a determination that the local security-relevant data is categorized as being out of the bounds of expected application behavior, determine whether the security threat is a legitimate threat or a false-positive threat, using a resolution agent running in the host computer, using the global security-relevant data downloaded from the security information plane system;
issue a security alert when the security threat is determined to be a legitimate threat; and
initiate an action in response to the security alert of the security threat, wherein the action includes quarantining or shutting down an application at risk.

12. The system of claim 11, wherein the at least one processor is configured to upload at least some of the local security-related data to the security information plane system from a security information plane application running in a virtual computing instance in the host computer, and download the global security-relevant data to the security information plane application running in the virtual computing instance in the host computer.

13. The system of claim 11, wherein the at least one processor is configured to use a whitelist model to categorize the local security-relevant data as being one of within bounds of expected application behavior and out of the bounds of expected application behavior.

14. The system of claim 12, wherein the resolution agent is running in the virtual computing instance in the host computer and the application behavior classifier is running outside of the virtual computing instance in the host computer.

* * * * *